Figure 1:
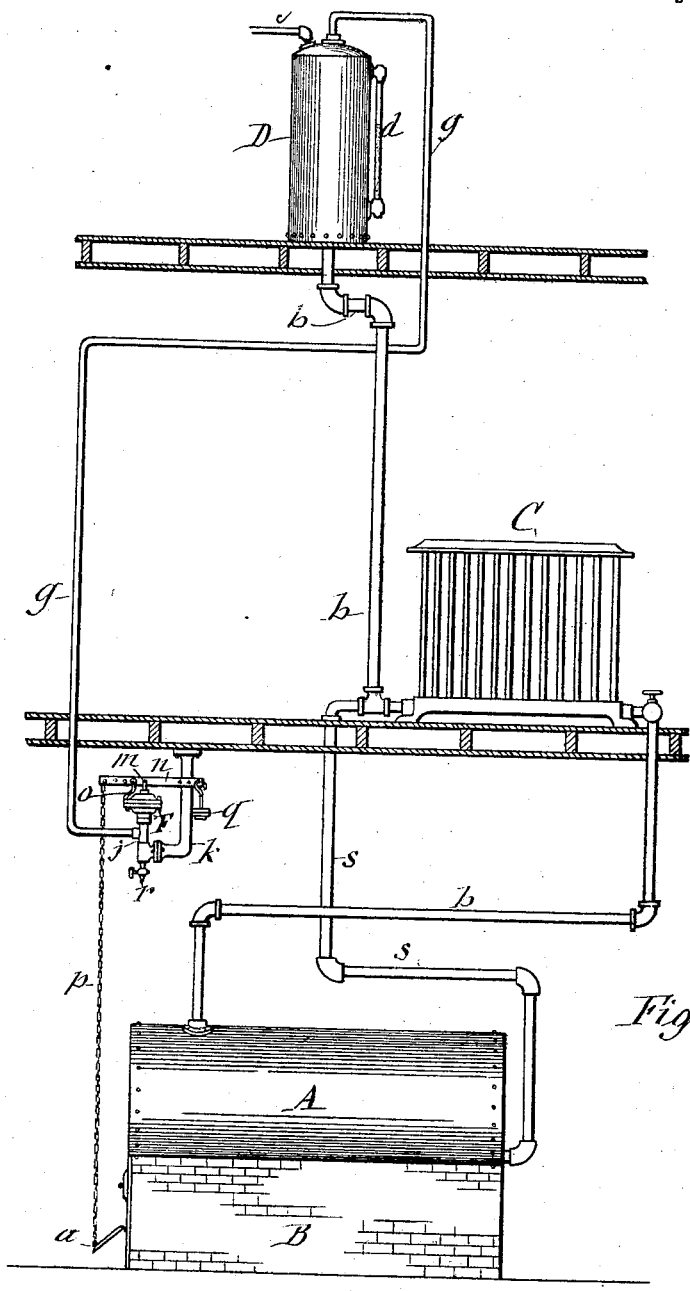

No. 865,865. PATENTED SEPT. 10, 1907.
A. CATCHPOLE.
AUTOMATIC REGULATOR FOR HOT WATER HEATING SYSTEMS.
APPLICATION FILED OCT. 23, 1905.

2 SHEETS—SHEET 1.

WITNESSES:

INVENTOR
Alfred Catchpole
By E. Laass
his ATTORNEY

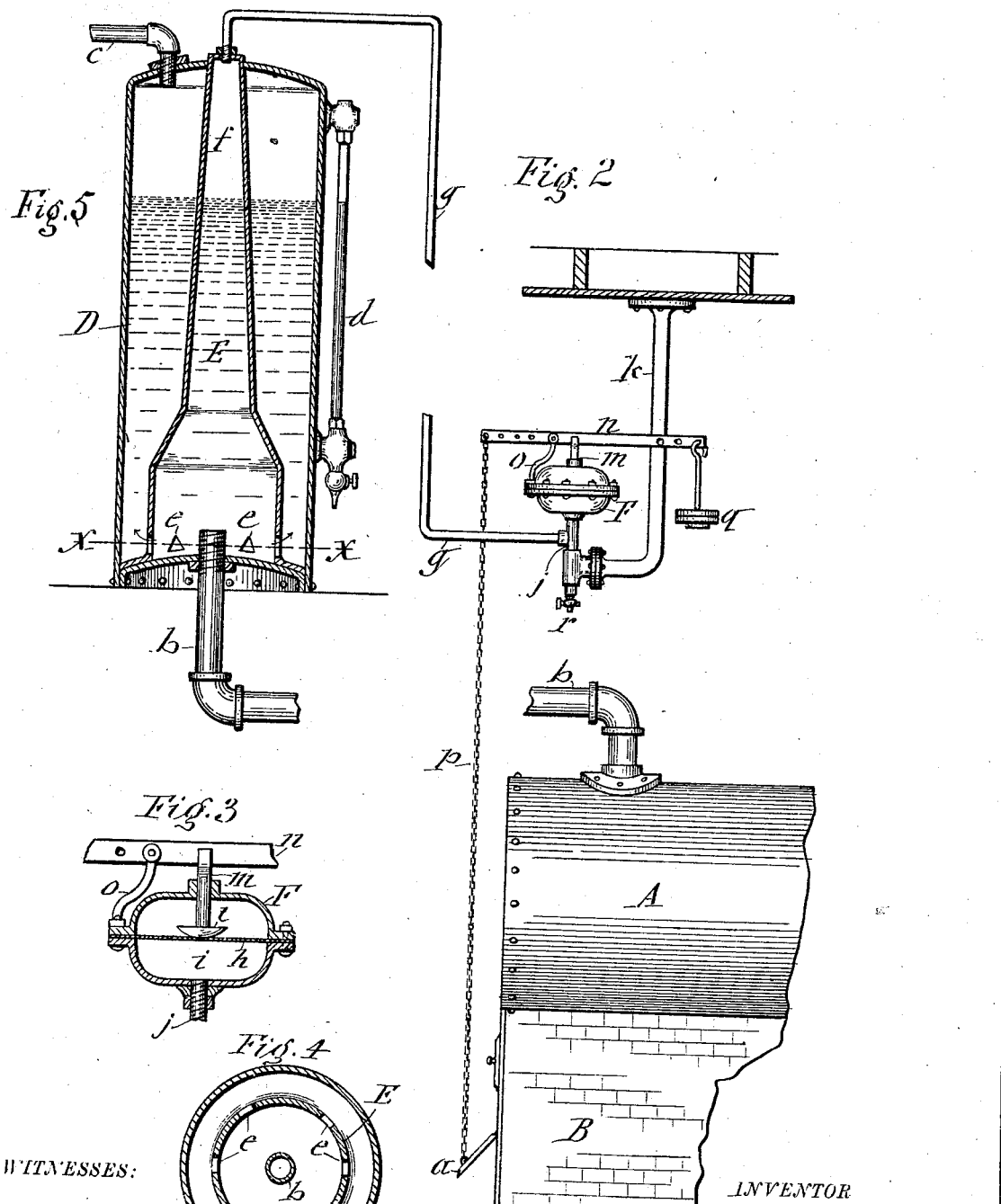

UNITED STATES PATENT OFFICE.

ALFRED CATCHPOLE, OF GENEVA, NEW YORK.

AUTOMATIC REGULATOR FOR HOT-WATER HEATING SYSTEMS.

No. 865,865.  Specification of Letters Patent.  Patented Sept. 10, 1907.

Application filed October 23, 1905. Serial No. 283,911.

*To all whom it may concern:*

Be it known that I, ALFRED CATCHPOLE, a citizen of the United States, residing at Geneva, in the county of Ontario, in the State of New York, have invented new and useful Improvements in Automatic Regulators for Hot-Water Heating Systems, of which the following, taken in connection with the accompanying drawings, is a full, clear, and exact description.

This invention pertains to heating-systems for buildings, and it relates more particularly to the style of heating-systems comprising a hot-water generator to which are connected variously arranged circulating or distributing-pipes usually supplying radiators disposed in the rooms or apartments of the building to be heated.

The object of the present invention is to provide a hot-water heating-system with inexpensive, efficient and reliable means for automatically controlling the combustion of fuel in the furnace of the generator and maintaining a uniform temperature in the building receiving heat from said system.

To that end the invention consists in the novel construction and arrangement of the component parts of the automatic regulator in combination with a heating-system as hereinafter fully described and set forth in the claims.

In the accompanying drawings, Figure 1 shows a hot-water heating-system of well known style and provided with an automatic regulator embodying my invention; Fig. 2 is a similar view on an enlarged scale of a portion of the device and illustrating parts of the regulator in section; Fig. 3 is an enlarged vertical transverse section of the air-chamber by which the damper-operating devices are controlled, and, Fig. 4 is a transverse section on the dotted line —X—X— in Fig. 5. Fig. 5 is an enlarged sectional elevation of the controlling tank.

Referring to the drawings —A— represents a hot-water generator consisting of any well known type of boiler, and —B— denotes the furnace thereof and which is provided with the usual damper or draft-door —a—. —b—b— denote the water-circulating pipes which extend from the generator through the building as represented in Fig. 1, and are connected to the usual radiators —C— located in the rooms or apartments of the building to be heated, the usual return pipe designated at S being arranged between the radiator C and generator A.

My automatic regulator comprises a suitably arranged upright cylindrical tank —D— which is connected at its bottom to one of the circulating-pipes at the highest point in the system and necessarily above the uppermost radiator thereof. This tank is preferably closed at its top and is provided with an overflow-pipe —c— extending from near its upper part. In order that the water-line may be observed, I provide the tank with the well known water-gage —d—. This latter arrangement is preferred, so that one of the circulating-pipes —b— may be connected directly with the bottom of said chamber, and the chamber is provided with openings —e—e— affording communication between said chamber and tank.

The chamber —E— has its upper portion gradually reduced circumferentially toward the top as a matter of preference so as to effect a quick compression of the air in the space —f— above the water-line as illustrated in Fig. 5, and for the purpose which will be shortly explained. From the upper end of said chamber —E— extends a pipe —g— communicating with the air-space thereof and leading to an air-chamber —F— disposed adjacent to the generator and furnace. Said air-chamber —F— is divided horizontally to form two sections between which is secured the edge of an elastic diaphragm —h— so as to produce an air-compartment below said diaphragm as indicated at —i— in Fig. 3 of the drawings. This air-compartment —i— communicates with the air-pipe —g— by means of a short vertical pipe —j— connected to the lower section of the chamber. I prefer to place this chamber —F— above the generator and support it by means of a suitable hanger or bracket —k— fastened to the ceiling or other convenient part of the building.

Upon the aforesaid elastic diaphragm —h— is seated a vertically movable piston —l— provided with a rod —m— extending through the top of the chamber —F— and loosely engaging a horizontally disposed lever —n—which is preferably pivoted intermediate its ends to an upwardly projecting arm —o— fastened to the chamber. This lever —n— is connected at one end to the aforesaid damper or draft-door —a— of the furnace by means of the usual chain —p— and to the opposite end of the lever is connected a weight —q—.

The aforesaid water-chamber —E— extends above the intake end of the overflow-pipe of the tank —D— so as to prevent the water from entering the air-pipe —g—.

The operation of the described regulator is as follows: It is obvious that, by opening the damper or draft-door —a— of the furnace —B—, increased combustion of the fuel is effected and results in the rapid heating of the water in the boiler. It is also obvious that this heating of the water will cause the same to expand and circulate through the system of pipes —b—b— and connected radiators —C—. The excessive heating of the water and its resultant expansion in the chamber —E— creates a compression of the air in the space —f— of the chamber. The expansion of the water in the system raises the water level in the cylinder D above the water level in the chamber E (owing to the air being confined in the chamber E, the pipe G and the regulator F) and the air is compressed as the result of this difference between these levels, and the amount of compression is directly proportioned to the magnitude of the difference. By this compression, the air is forced through the pipes —g— —j— into the compartment —i— of the chamber —F—, thereby imparting upward flexure to the elastic diaphragm —h— which forces up the piston —l— and causes the rod —m— to raise the weighted end of the lever —n—, whereby the chain —p— connected to the opposite end of the lever allows the damper or draft-door —a— of the furnace to close, thus reducing the combustion of fuel. It is understood that this checking of the fire will reduce the expansion of the water in the system and thereby cause the water to recede and consequently be lowered in the tank D and chamber —E—, thus relieving the air in the top of the chamber and in the pipes —g—j— and compartment —i— of the chamber —F— from pressure. By relief of air-pressure in the compartment —i— of the chamber —F—, the diaphragm —h— is caused to relax, whereby the piston —l— and its rod —m— are allowed to move down to permit the weight —q— to actuate the lever —n— and chain —p— and thereby open the aforesaid damper or draft-door —a— to increase the combustion in the furnace as before.

It will be apparent that by regulating the heating-system in the manner described, a uniform degree of temperature of a building may be maintained.

It is obvious that, inasmuch as the damper of the water-heater is controlled by the action of the diaphragm produced by compression of the air in the chamber —E—, the temperature of the water can be varied to any desired degree by moving the counterweight to a greater or less distance from the fulcrum of the lever and thus vary the resistance of the diaphragm.

It will be understood that the chamber —E— is to be first supplied with air in any suitable manner, and that this supply is maintained in the chamber by the air and gases rising from the water in the heating-system and passing through the pipe —b— into the said chamber. In case the said supply of air becomes excessive, the back-pressure causes the surplus air or gas to escape through the openings —e—e— into the tank —D— and thence out through the overflow pipe —c—.

—r— represents a pet-cock which communicate with the air-pipe —g— and is preferably attached to the lower end of the pipe —j—. Through this pet-cock air may be forced into the pipes —j— —g— to charge the chamber —E— with air under pressure, or air may be allowed to escape through said pet-cock to reduce the pressure of the air in the chamber —E—.

What I claim as my invention is:—

1. The combination with a hot-water heating-system including a generator and radiating devices, of an automatic pneumatic regulator comprising an air-chamber, a vertically movable rod projecting above said chamber and actuated by air-compression, means operated by said rod for controlling the generator of the system, a water containing tank, a shell closed at the upper end and communicating with the interior of the tank at the lower end and disposed within the said tank and extending above the water line in the tank, a pipe between said air chamber and the pneumatic regulator, and a pipe between said tank and the radiating devices.

2. The combination with a hot-water heating-system, of an automatic pneumatic regulator comprising a water-tank disposed above the highest point of the system and supplied thereby, a chamber disposed within said tank and supported upon the bottom thereof and communicating with the tank thereat, said chamber having an air-compressing space, a chamber disposed adjacent to and above the generator of the system and provided with an elastic horizontal diaphragm forming an air-compartment below said diaphragm communicating with the aforesaid air-space of the water-chamber, a vertically movable piston seated upon said diaphragm and controlled by the movements of the diaphragm caused by the compression of the air and its relief from pressure, the piston-rod extending through the top of the latter chamber, a lever pivoted to the top of the said chamber and engaged by said piston-rod, and means connecting said lever to a damper or draft-door of the generator-furnace as set forth.

ALFRED CATCHPOLE. [L. S.]

Witnesses:
CHAS. S. BURRALL,
DANIEL P. TOMPKINS.